United States Patent
Lasjunies et al.

(10) Patent No.: US 10,650,105 B2
(45) Date of Patent: May 12, 2020

(54) METHOD AND SYSTEM FOR AUTOMATICALLY TRANSLATING PROCESS INSTRUCTIONS

(71) Applicant: SIEMENS AKTIENGESELLSCHAFT, Munich (DE)

(72) Inventors: Richard Lasjunies, Castelnau D'Estretefonds (FR); Nicolas Teissie, Balma (FR)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/029,790

(22) Filed: Jul. 9, 2018

(65) Prior Publication Data

US 2019/0012312 A1    Jan. 10, 2019

(30) Foreign Application Priority Data

Jul. 7, 2017  (EP) .................................... 17290091

(51) Int. Cl.
*G06F 17/28* (2006.01)
*G06F 9/455* (2018.01)
*G05B 19/418* (2006.01)

(52) U.S. Cl.
CPC ........ *G06F 17/289* (2013.01); *G06F 17/2827* (2013.01); *G06F 17/2836* (2013.01); *G05B 19/41865* (2013.01); *G06F 9/4552* (2013.01)

(58) Field of Classification Search
CPC ...... G06F 9/30; G06F 9/30145; G06F 9/3017; G06F 9/30174; G06F 9/30178;
(Continued)

(56) References Cited

U.S. PATENT DOCUMENTS 8,434,071 B2   4/2013  Solimano
2007/0233460 A1  10/2007  Lancaster et al.
2009/0070749 A1*  3/2009  Solimano .................. G06F 8/10
                                              717/137

FOREIGN PATENT DOCUMENTS

EP         2037374 A1    3/2009

OTHER PUBLICATIONS

Piperidis et al "TR.AID: A Memory-based Translation Aid Framework", Proceedings of the Natural Language Processing and Industrial Applications Conference, NLP+IA, vol. 1, XP055442318, Moneten, New Brunswick, Canada, Aug. 18, pp. 1-7, (Year: 1998).*
(Continued)

*Primary Examiner* — Leshui Zhang
(74) *Attorney, Agent, or Firm* — Laurence Greenberg Werner Stemer Ralph Locher

(57) ABSTRACT

A method and system automatically translate process instructions. In the method, a process instruction is received in a first language that different from a second language being the operating language of the manufacturing execution system (MES). A text of the received process instruction is extracted in real time by a processing unit using an extraction algorithm. The method continues with searching and finding in real time in a database a translation of the extracted text into the second language. The database includes for all texts of all process instructions expressed in the first language, a translation of said texts into the second language. The texts in the first language and their corresponding translation are preferentially organized in a dictionary. Further, creating a process instruction in the second language from the found text in the second language and automatically displaying in real time the process instruction in the second language.

12 Claims, 2 Drawing Sheets

(58) Field of Classification Search
CPC .... G06F 9/30196; G06F 9/4552; G06F 9/455;
G06F 9/45508; G06F 9/45516; G06F
17/2705; G06F 17/271; G06F 17/2715;
G06F 17/272; G06F 17/2735; G06F
17/274; G06F 17/2745; G06F 17/275;
G06F 17/2755; G06F 17/27656; G06F
17/277; G06F 17/2775; G06F 17/2785;
G06F 17/28; G06F 17/2809; G06F
17/2018; G06F 17/2827; G06F 17/2836;
G06F 17/2845; G06F 17/2854; G06F
17/2872; G06F 17/2881; G06F 17/289;
G05B 19/41865
USPC ...................................................... 704/1–10
See application file for complete search history.

(56) References Cited

OTHER PUBLICATIONS

Van Gompel et al: "Extending Memory-Based Machine Translation to Phrases", Computational Linguistic in the Netherlands 2010: Selected Papers From the Twentieth Clin Meeting., XP055442405, abstract, Sections 1 and 2 / Feb. 5, 2010.

Piperidis et al: "TR-AID: A Memory-based Translation Aid Framework", Proceedings of the Natural Language Processing and Industrial Applications Conference, NLP + IA, vol. 1, XP055442318, Moneten, New Brunswick, Canada, summary, Sections 1 and 2 / Aug. 18, 1998.

* cited by examiner

METHOD AND SYSTEM FOR AUTOMATICALLY TRANSLATING PROCESS INSTRUCTIONS

CROSS-REFERENCE TO RELATED APPLICATION

This application claims the priority, under 35 U.S.C. § 119, of European patent application EP 17290091.2, filed Jul. 7, 2017; the prior application is herewith incorporated by reference in its entirety.

BACKGROUND OF THE INVENTION

Field of the Invention

The invention relates to a method and a system for automatically translating in real time process instructions within a Manufacturing Execution System (hereafter "MES").

As defined by the Manufacturing Enterprise Solutions Association (MESA International), an MES is "a dynamic information system that drives effective execution of manufacturing operations," by managing "production operations from point of order release into manufacturing to point of product delivery into finished goods" and by providing "mission critical information about production activities to others across the organization and supply chain via bi-directional communication."

The functions that MESs usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking.

Siemens AG (Siemens Corporation), for instance, offers a broad range of MES products under its SIMATIC IT® product family.

In pharmaceutical industries, MESs help companies to design complex manufacturing processes which cover the creation of electronic batch records, as well as exhaustive description of a batch manufacturing story. Such processes can embed human and automated operations, orchestrated in large workflows, and executed over long periods.

For such regulated industries such as the pharmaceutical industry, MESs must propose a high level of usability for operators, who can physically work in restrictive environment (e.g. standup, wearing gloves or glasses, etc.), and also features required to validate, trace and audit process design and execution. Additionally, due to the globalization of large companies, MESs need to operate in multi-languages context, wherein process instructions have to be validated for different languages used within a company. In case of text translation, this requirement could become a painful and unproductive constraint for the company if the validation workflow required for validating process instructions in a specific language is complex. Indeed, process instructions are designed and executed in regulated contexts, wherein any simple modification of a process instruction triggers a full validation workflow before use in production.

In order to avoid, for each of the translated process instructions, a full validation workflow before use in production, MES editors usually propose either to use only and uniquely a main language, such as English, within the company and to train the operator, or to duplicate process instructions in other languages and validate the process instructions in each language. That process is time consuming.

SUMMARY OF THE INVENTION

It is accordingly an object of the invention to provide an automatic instruction translation process and system which overcomes the above-mentioned and other disadvantages of the heretofore-known devices and methods of this general type and which provides for an MES capable of operating in different languages in a regulated context, while being free of a complex validation workflow.

With the foregoing and other objects in view there is provided, in accordance with the invention, a novel method for automatically translating, in real time, process instructions within a manufacturing execution system (MES). That is, the objects of the invention are achieved by a method and a system for automatically translating in real time process instructions within a MES. Indeed, the present invention proposes to design and validate process instructions in only one language, called hereafter the first language or main language, and then to translate automatically and in real time the validated process instructions in any other language that corresponds to the operating language of the MES, for instance in a second language, avoiding therefore a complex validation workflow for having process instructions validated in the second language since the process instructions validated in the first language are not altered. By this way, the MES is therefore capable of operating in a multi-languages context while satisfying the regulated context ruling the process instructions.

More precisely, the present invention provides a method for automatic and real time translation of process instructions within a MES, wherein the process instructions are stored within the MES in a first language for which they have been validated and that is different from a second language which is the operating language of the MES, the method comprising the following steps:

receiving a process instruction in a first language to be displayed in a second language different from the first language;

extracting in real time, by means of a processing unit using an extraction algorithm, text composing the received process instruction, for instance a static sentence and/or a word, wherein the text is configured for being displayed on an user interface, like a screen;

for each extracted text, e.g. static sentence and/or word, searching and finding in real time in a database a translation of the text, e.g. of the sentence and/or word, into the second language, wherein the database comprises for each text, e.g. for each sentence and/or word, of all process instructions stored in the first language, a translation of the text into the second language;

extracting from the database each found text, e.g. sentence and/or word, in the second language;

creating in real time a process instruction in the second language from the found text, e.g. sentence and/or word, in the second language;

automatically displaying in real time (on a user interface) the process instruction in the second language.

According to the present invention, the MES is in particular free of any process instructions stored in the second language and only comprises process instructions stored in the first language.

According to a preferred embodiment, the method further comprises a first step related to the creation and validation of process instructions in the first language for the MES wherein validated process instructions are stored within the MES in the first language, then a second step related to the creation of the above-mentioned database from the already validated process instructions in the first language, and a third step, which has been previously described, that allows according to the invention the automatic display of a process instruction in the second language from a real time translation of a requested process instructions stored in the first language within the MES when the MES operated in the second language has to display a process instruction.

The first step comprises well-known design and validation of process instructions according to regulated contexts in order to allow the release of the process instruction within the MES. The first step is well-known to the skilled person and does not need to be described in more details.

The second step proposes the creation of the database used during the automatic real time translation of process instructions from the first language to the second language according to the present invention. In order to create the database, a processing unit is notably configured for extracting a sentence and/or word from each of the process instructions that have been validated for the MES operating in the first language. In particular, the processing unit is configured for organizing the extracted sentences and/or words in a dictionary stored in the database, for instance by creating a list of the extracted sentences and/or words organized alphabetically. For this purpose, the processing unit is notably configured for using an extraction algorithm that is capable of splitting up or parsing process instructions into sentences and/or words and organizing the latter in a dictionary.

For each of the extracted sentence and/or word, a translation into at least one other language that is different from the first language is provided and stored in the database, which is therefore free of any storage of a complete process instruction in the second language: indeed, only words and sentences of process instructions, i.e. part of process instructions are stored in the second language, i.e. only partial process instructions are stored in the second language and the MES does not comprise complete process instructions stored in the second language. For instance a translation of each of the extracted sentences and/or word into the second language is defined for the latter, for instance in the dictionary, and stored in the database. In particular, the translation of each of the extracted sentences and/or words from the first language into the second language might be performed by an accredited translator. The database is then used by the MES for automatic real time translation of process instructions into the operating language of the MES, for instance in the second language, free of any alteration or modification of the validated process instructions.

Finally, the present invention also proposes a computer implemented system for automatic and real time translation of process instructions within a MES, the computer implemented system, called hereafter simply "system", comprising a processing unit, a memory and a user interface, wherein the processing unit comprises computer executable instructions that, when executed, cause the computer implemented system to perform all the steps of the previously described method, and wherein the memory comprises the database wherein extracted sentences and/or words are in particular organized in a dictionary. The present invention also concerns a MES configured for implementing the claimed method, for instance a MES comprising the above-mentioned system.

Other features which are considered as characteristic for the invention are set forth in the appended claims.

Although the invention is illustrated and described herein as embodied in a method and system for the automatic translation of process instructions, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
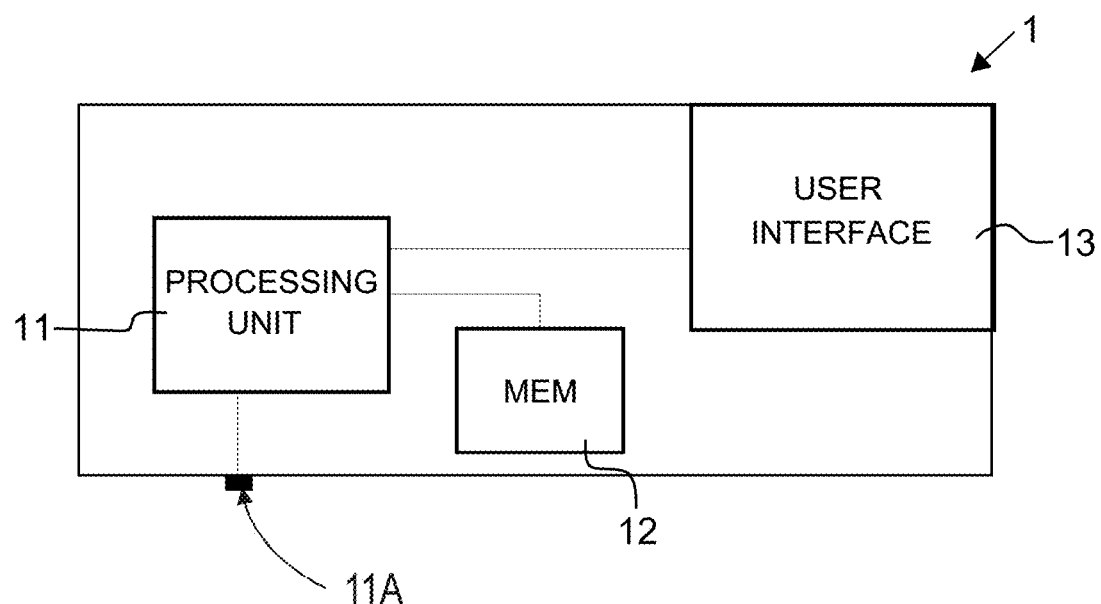
FIG. 1 is a schematic representation of a system according to the invention.

Referring now to the figures of the drawing in detail and first, particularly, to FIG. 1 thereof, there is shown a preferred embodiment of a system 1 according to the invention. The system 1 comprises the following components: a processing unit 11, a memory 12 and a user interface 13. The processing unit 11, or processor, is connected to the memory 12 and to the user interface 13 which allows displaying data/information to an operator and/or entering data provided by the operator. The system 1 might be embedded within a MES and/or may have part of its components forming a plug and play module. For instance, the processing unit 11 and the memory 12 according to the invention may preferentially form the plug and play module, which is an independent module that might be added and/or removed from an existing MES in order to enable the latter operating in a multi-language environment. In this case, and in particular, the processing unit 11 may have connection means 11A for exchanging data with the MES, notably with its user interface and/or any processing unit of the MES in order to receive information about requested process instructions and provide the MES with translated process instructions.

Figure 2:
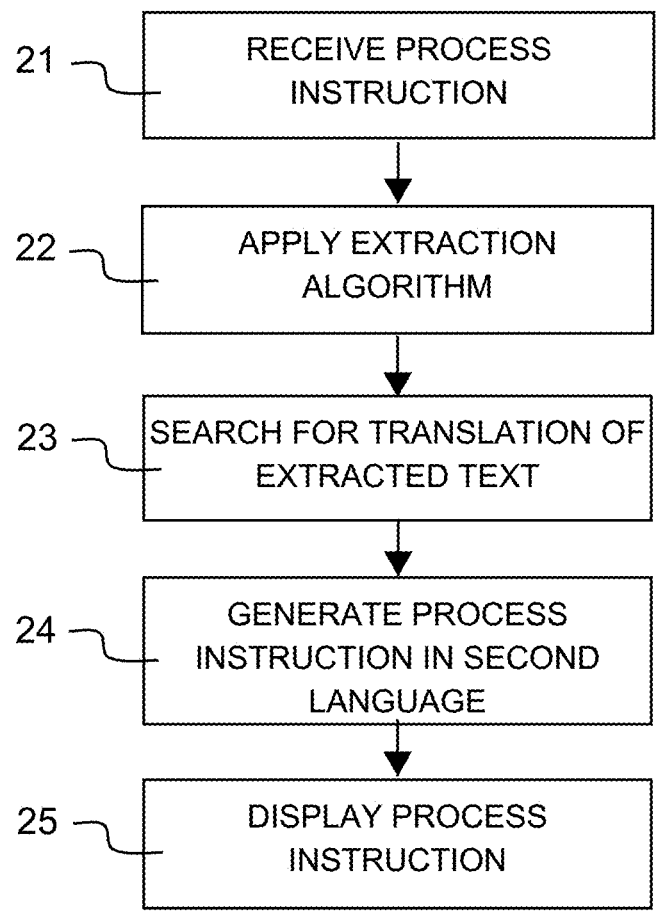
FIG. 2 is a schematic flow diagram of the method according to the invention.

The method according to the invention is schematically represented by FIG. 2, wherein the system 1 according to the invention, in particular its processing unit 11, receives 21 via the connection means 11A a process instruction, wherein the process instruction is stored in a first language within the MES (i.e. it is not stored in a second language), and has to be displayed in the second language. The process instruction in the first language might be stored in a memory of the MES and automatically provided to the system according to the invention when the process instruction is requested for display. For instance, the MES may generate a request for displaying a process instruction, or an action of an operator or another device may generate the request for displaying a process instruction. In other words, the request for displaying the process instruction might result for instance from an operator action, or from a change of a parameter within the MES, or from a value being reached for a parameter of the MES, or from an alert, or being a result of a previous action, etc. Typically, the MES is capable of searching the requested process instruction in a memory or database and is configured for automatically providing the requested process instruction to the system 1 according to the invention.

According to the present invention, such a request automatically triggers the translation process according to the invention, wherein the MES provides the requested process instruction to the processing unit 11 which will launch its translation at the reception of the process instruction. The whole process according to the invention is fully automatic and takes place in real time.

The processing unit 11 typically receives the process instruction in the first language and is then configured for extracting 22 from the received process instruction a sentence and/or a word that compose/s the received process instruction. For this purpose, the processing unit 11 comprises preferentially an extraction algorithm which, when executed, is configured for splitting the process instruction into words and/or sentences.

The memory 12 comprises a database that identifies or lists sentences and/or words of and for all process instructions of the MES in the first language. For each of the sentences and/or words, the memory 12 comprises a translation of the sentence and/or word into the second language. Preferentially, the list of the sentences and/or words for all process instructions of the MES in the first language and their corresponding translation in the second language may form or be organized in a dictionary. Advantageously, the database may comprise translation in other languages, like a third or fourth language, which are all different from the first language, the system according to the invention comprising notably complete process instructions only stored in the first language.

After extraction of sentences and/or words from the received process instruction, the processing unit 11 is configured for searching 23 in the database 12 the translation in the second language of each extracted sentence and/or word and creating 24 a process instruction in the second language from the translation, in the second language, of each extracted sentence and/or word, the created process instruction in the second language corresponding therefore to (i.e. is a translation of) the process instruction received in the first language.

Finally, the processing unit 11 is configured for automatically displaying 25 the process instruction in the second language, for instance on the user interface 13.

Figure 3:
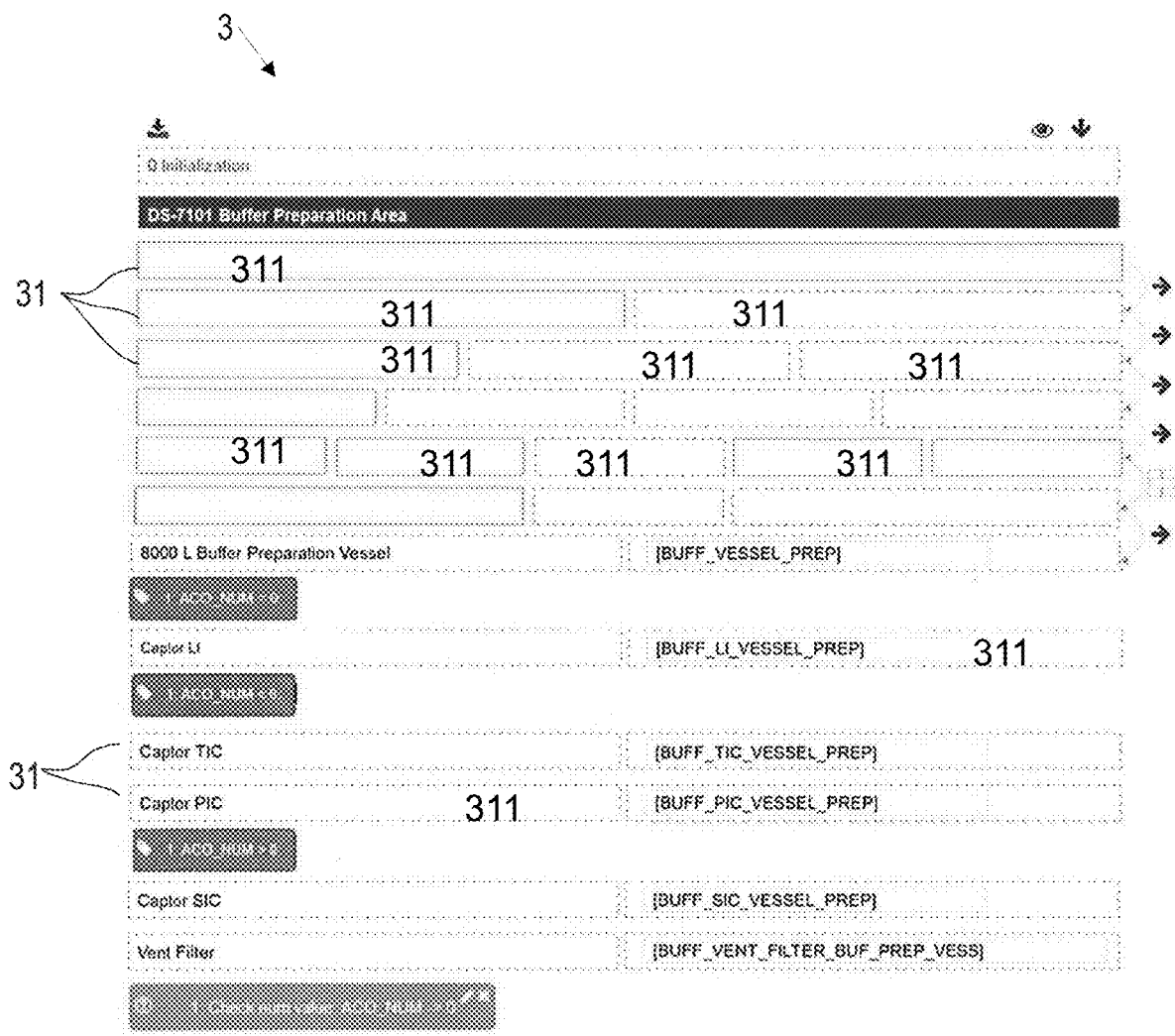
FIG. 3 shows a schematic representation of a process instruction according to the invention.

The process instruction according to the invention is typically an instruction that is displayed on a user interface for an operator of the MES and that concerns a process performed by the MES. According to the present invention, text comprised within the process instruction, like the sentence and/or word, and that is designed for being displayed for the operator is extracted in real time, by means of the processing unit, in order to proceed to its translation according to the invention. Preferentially, the processing unit 11 according to the invention may use parsing techniques for extracting the sentence and/or word from the process instruction expressed in the first language. A preferred embodiment of process instructions according to the present invention is presented in FIG. 3. According to the preferred embodiment, process instructions 3 are preferentially dynamic and flexible, in that each process instruction is in particular structured into flexible sections 31 (see the lines shown in FIG. 3), wherein each section is a container for user or automate controls (i.e. a user interface area that might be displayed to an operator, and which is configured for user or automate controls), the container being organized in cells 311, wherein the cells 31 can in particular be merged if required. Preferentially, the system according to the invention comprises an inline designer button configured for enabling a designing of the section, or its saving, or its reusing as template, or a modification of the content of a section. Preferentially, a section according to the invention may include one or several parts, for instance one or several cells that might be kept hidden from an operator, while being always visible in an electronic batch record. The process instruction according to the invention further comprises a user control that can be added to a section of the process instruction, the user control enabling satisfying requirements to fill an audit trail of the electronic batch record, and avoiding therefore any misuse. Finally, the process instruction according to the invention may also comprise inline logical operations, wherein the section preferentially includes inline operator and programmatic commands. They can for instance be used for implementing process logic based on operator or automate input, as well as for embedding calculation, that is hidden to an operator, but used to pilot a process.

Advantageously, the section, user control, and inline operator and programmatic commands of the process instruction according to the invention make it possible to adjust the rendering of the process instruction in function of its usage. Compared to existing solutions, it is possible to design a single process instruction comprising three different rendering, wherein the process instruction comprises not only traditional user interface with operator, but also software parts like a communication with automates, scripts, specific dialog box or call to functional modules. Therefore, the present invention enables to have a single validated instance, i.e. the process instruction, that groups three different characteristics: being rich and flexible for the designer, readable and efficient for the operator, and exhaustive and qualified for regulation authorities.

The invention claimed is:

1. A method for automatically translating, in real time, process instructions within a manufacturing execution system (MES), the method comprising the following steps:
   receiving a process instruction in a first language different from a second language that is an operating language of the MES, the first language being a language spoken by humans, wherein the process instruction in the first language is part of a workflow that has been validated in the first language;
   extracting in real time, by a processing unit using an extraction algorithm, a text from the process instruction to generate an extracted text;
   searching a database in real time to find a translation of the extracted text into the second language, the database containing a translation into the second language for all texts of all process instructions of the MES expressed in the first language;
   creating in real time a process instruction in the second language from the extracted text, wherein the process instruction in the second language is part of a workflow that is not validated in the second language; and
   displaying in real time the process instruction in the second language.

2. The method according to claim 1, which further comprises carrying out each of the method steps automatically.

3. The method according to claim 1, wherein the texts in the first language and a corresponding translation are preferentially organized in a dictionary.

4. The method according to claim 1, comprising, as a preliminary step, creating the database by automatically extracting for each process instruction stored within the MES system in the first language a text and storing a translation of the text in the second language in order to generate the database.

5. The method according to claim 1, wherein the extracted text is a sentence and/or a word.

6. The method according to claim 1, wherein each process instruction is structured into flexible sections, wherein each of the flexible sections is a container for user or automate controls that is organized in cells.

7. The method according to claim 1, wherein the first language is English.

8. The method according to claim 1, wherein the second language is a language spoken by humans.

9. The method according to claim 1, wherein the workflow is validated in the first language due to a requirement of authorities regulating an industry in which the workflow is used.

10. A computer implemented system for automatically translating, in real time, process instructions within a manufacturing execution system (MES), the computer implemented system comprising:
a processing unit, a memory and a user interface configured for carrying out a method for automatically translating, in real time, process instructions within the manufacturing execution system (MES), the method comprising the following steps:
receiving a process instruction in a first language different from a second language that is an operating language of the MES, the first language being a language spoken by humans, wherein the process instruction in the first language is a part of a workflow that has been validated in the first language;
extracting in real time, by a processing unit using an extraction algorithm, a text from the process instruction to generate an extracted text;
searching a database in real time to find a translation of the extracted text into the second language, the database containing a translation into the second language for all texts of all process instructions of the MES expressed in the first language;
creating in real time a process instruction in the second language from the extracted text, wherein the process instruction in the second language is part of a workflow that is not validated in the second language; and
displaying in real time the process instruction in the second language.

11. A system, comprising:
a manufacturing execution system (MES) including a computer implemented system for automatically translating, in real time, process instructions within the manufacturing execution system;
the computer implemented system including: a processing unit, a memory and a user interface configured for carrying out a method for automatically translating, in real time, the process instructions within the manufacturing execution system, the method comprising the following steps:
receiving a process instruction in a first language different from a second language that is an operating language of the MES, the first language being a language spoken by humans, wherein the process instruction in the first language is part of a workflow that has been validated in the first language;
extracting in real time, by the processing unit using an extraction algorithm, a text from the process instruction to generate an extracted text;
searching a database in real time to find a translation of the extracted text into the second language, the database containing a translation into the second language for all texts of all process instructions of the MES expressed in the first language;
creating in real time a process instruction in the second language from the extracted text, wherein the process instruction in the second language is part of a workflow that is not validated in the second language; and
displaying in real time the process instruction in the second language;
the MES further comprising a memory storing process instructions in the first language different from the second language that is the operating language of the MES; and
the computer implemented system being automatically provided with the process instruction in the first language in order to be translated into the second language.

12. The system according to claim 11, wherein the computer implemented system is a plug and play module.

* * * * *